Aug. 4, 1970    R. L. WINKLER    3,522,643

RESILIENT TABLE ROLLER

Filed Sept. 15, 1967

INVENTOR
Robert L. Winkler

United States Patent Office 3,522,643
Patented Aug. 4, 1970

3,522,643
RESILIENT TABLE ROLLER
Robert L. Winkler, Bethlehem, Pa., assignor to Bethlehem Steel Corporation, a corporation of Delaware
Filed Sept. 15, 1967, Ser. No. 667,889
Int. Cl. B21b 31/08
U.S. Cl. 29—130                                    3 Claims

ABSTRACT OF THE DISCLOSURE

Mill approach table resilient roller which consists of three separate parts, namely, an external steel shell, an elastomer core and a central steel shaft, bonded together to form a unit assembly having favorable stress distribution.

BACKGROUND OF THE INVENTION

This invention relates generally to a roller for a mill approach table and more particularly to a composite resilient roller that withstands severe shock and impact loading.

The conventional roller for a mill approach table has a solid steel body with integral shaft extension on either end for journal support and means for driving. The body is very rigid and any load applied to it is transmitted to the journals through the relatively small shaft extensions. This results in high localized stresses at the change in cross section from the roll body to the shaft extensions. Failure by fracture is frequent at this point. A fractured roller can not be economically repaired.

SUMMARY OF THE INVENTION

It is therefore an object of this invention to provide a roller that distributes the impact load energy substantially uniformly throughout the roller and thereby eliminates the areas of high localized stress which cause premature failure.

It is also an object of this invention to provide a roller that can be repaired easily for reuse.

The instant invention provides a composite roller of three separate parts bonded together to form an assembly that withstands severe shock and impact loading and can be repaired easily for reuse by salvaging either or both of the steel parts and replacing the elastomer.

DESCRIPTION OF THE PREFERRED EMBODIMENT

Figure 1:
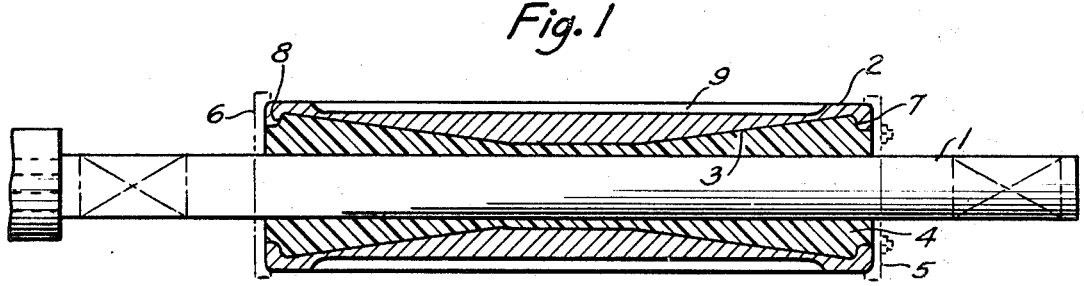
FIG. 1 is a sectional view of the roller assembly.

Referring now to the figures and particularly to FIG. 1, the instant invention comprises a roller having three separate parts bonded together to form a unit assembly, namely, a center steel shaft 1 of constant diameter, an outer rigid steel shell 2 having a bore 3 resembling a venturi, or hourglass shape and an elastomer 4 which acts as both a bond and separator between the shell 2 and shaft 1. The cover plates 5 and 6 shown on the ends of the outer shell are removable and are used for positioning the center shaft 1 in the bore 3 of the outer shell 2 and for completing a mold form for liquid elastomer. After the elastomer has cured, the cover plates are removed. The choice of elastomer is determined by its ease of handling, its ability to form a good bond to steel, its extreme durability under mechanical abuse, its energy absorption capacity, and relatively high resistance to heat. An elastomer which possesses these characteristics to a satisfactory degree is polyester urethane. A mechanical locking or holding means 7 and 8 is added to the ends of the outer shell to lock the molded elastomer inside the space between the outer shell and the shaft should the bond fail prematurely. A preferred embodiment shows this feature to be in the form of inverted flanges at the ends of the outer shell. The grooves or splines 9 on the periphery of the outer shell 2 are one form of surface corrugation normally found on mill approach table rollers and do not form any part of the instant invention.

Figure 2:
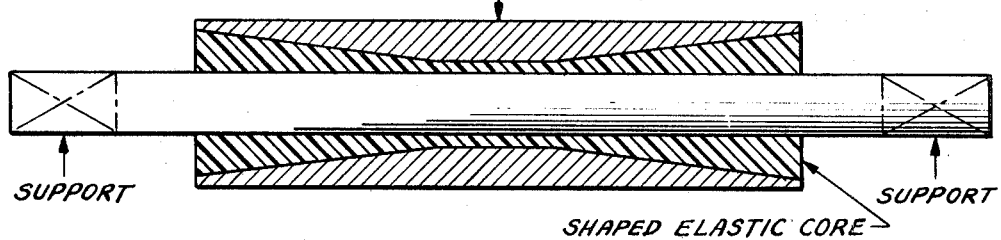
FIG. 2 is another sectional view of a roller of the instant invention with a load applied.
Figure 3:
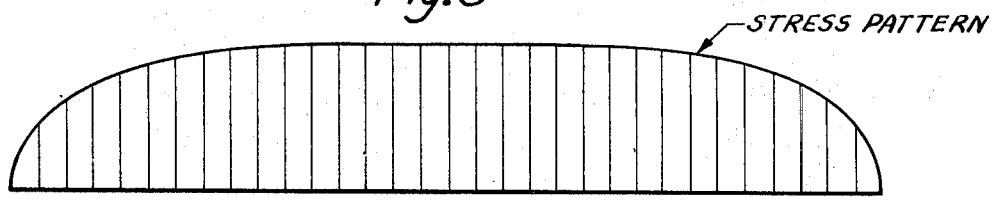
FIG. 3 is the corresponding resultant stress pattern.
Figure 4:
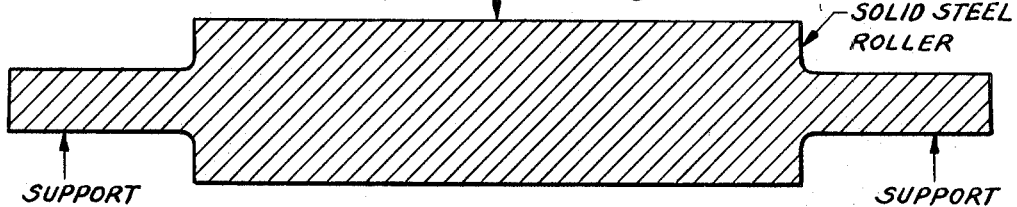
FIG. 4 is a sectional view of a roller of the prior art with a load applied.
Figure 5:
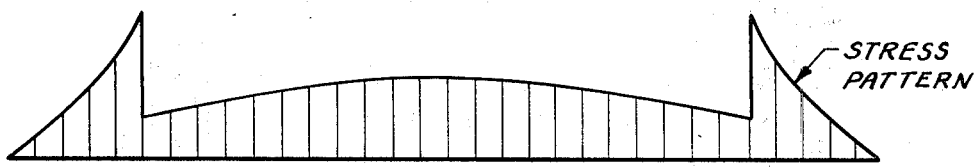
FIG. 5 is the corresponding resultant stress pattern.

The shape of the elastomer is determined by the shape of the bore of the outer rigid shell. The thickness of the outer shell is greatest at the longitudinal midpoint thereof, so that greater support for a load is available at that point than at the ends of the shell. This tends to reduce shaft deflection and stress at the center and permits greater deflection and stress to occur towards the ends. The net result of this combination of material and shape is that the impact energy from external loading is partially dissipated in the elastomer and the balance is absorbed in uniform deflection of substantially the entire center shaft. The result is a relatively low uniform stress level throughout a major portion of the length of the shaft which is illustrated in FIGS. 2 and 3. For comparison FIGS. 4 and 5 illustrate the stress pattern for a solid steel roller of prior art similarly loaded.

Should this roller ultimately fail due to a breakdown of the elastomer, it can be refilled for reuse. Also shafts or outer shells can be replaced.

Thus it is seen that the instant invention provides a roller that distributes load impact energy substantially uniformly and eliminates areas of high localized stress. It also permits maintenance and repair without complete replacement.

I claim:
1. A composite resilient roller adapted for a mill approach table comprising a center steel shaft having a constant diameter, an outer shell having a bore of a substantially venturi shape, and an elastomer bonding said steel shaft to said shell.

2. The roller according to claim 1 in which said elastomer is energy absorbing, heat resistant, and so shaped by the bore of the outer shell as to uniformly distribute the balance of the strain energy along at least a major portion of the length of the shaft.

3. The roller according to claim 1 in which said elastomer is energy absorbing, heat resistant, and shaped to have low volume at the longitudinal center of the roll body and gradually increasing volume as it approaches the ends of the roll body to produce a smooth curve stress pattern with no points of localized stress.

References Cited

UNITED STATES PATENTS

| 619,496 | 2/1899 | Munsey | 29—130 X |
| 2,450,727 | 10/1948 | Haushalter. | |
| 2,481,812 | 9/1949 | Beatrice | 29—123 |
| 3,019,511 | 2/1962 | Hornbostel | 29—130 |

FOREIGN PATENTS 712,794   7/1965   Canada.

WALTER A. SCHEEL, Primary Examiner
L. G. MACHLIN, Assistant Examiner